(12) United States Patent
Smith, III

(10) Patent No.: US 7,762,824 B2
(45) Date of Patent: Jul. 27, 2010

(54) HYDRAULIC COUPLING MEMBER WITH ELECTRICAL BONDING CONTRACTOR

(75) Inventor: Robert E. Smith, III, Missouri City, TX (US)

(73) Assignee: National Coupling Company, Inc., Stafford, TX (US)

( * ) Notice: Subject to any disclaimer, the term of this patent is extended or adjusted under 35 U.S.C. 154(b) by 733 days.

(21) Appl. No.: 11/683,724

(22) Filed: Mar. 8, 2007

(65) Prior Publication Data

US 2008/0216907 A1 Sep. 11, 2008

(51) Int. Cl.
*H01R 4/60* (2006.01)
(52) U.S. Cl. ..................................... 439/192
(58) Field of Classification Search .............. 439/192, 439/194, 197, 191, 208
See application file for complete search history.

(56) References Cited

U.S. PATENT DOCUMENTS

| | | | | | |
|---|---|---|---|---|---|
| 211,833 | A | * | 2/1879 | Buchtel | 174/47 |
| 455,021 | A | * | 6/1891 | Krehbiel | 439/192 |
| 482,778 | A | * | 9/1892 | Barnard | 340/320 |
| 499,254 | A | * | 6/1893 | Sargent | 439/192 |
| 539,000 | A | * | 5/1895 | Fowler | 439/194 |
| 539,017 | A | * | 5/1895 | Fowler | 439/192 |
| 709,216 | A | * | 9/1902 | Goodwin | 439/192 |
| 749,633 | A | * | 1/1904 | Seeley | 439/192 |
| 2,510,125 | A | * | 6/1950 | Meakin | 174/47 |
| 3,170,137 | A | * | 2/1965 | Brandt | 340/855.1 |
| 3,483,503 | A | * | 12/1969 | Paradiso | 439/192 |
| 3,518,609 | A | * | 6/1970 | Fontenot, Jr | 439/191 |
| 3,696,332 | A | * | 10/1972 | Dickson et al. | 340/855.1 |
| 3,895,850 | A | * | 7/1975 | Engle et al. | 439/34 |
| 4,121,193 | A | * | 10/1978 | Denison | 340/855.1 |
| 4,138,178 | A | * | 2/1979 | Miller et al. | 439/192 |
| 4,220,381 | A | * | 9/1980 | van der Graaf | 340/853.7 |
| 4,302,064 | A | * | 11/1981 | Spinner | 439/198 |
| 4,537,457 | A | * | 8/1985 | Davis et al. | 439/190 |
| 4,547,029 | A | * | 10/1985 | Kutnyak et al. | 439/194 |
| 4,694,859 | A | | 9/1987 | Smith, III | |
| 4,817,668 | A | | 4/1989 | Smith, III | |
| 4,884,584 | A | | 12/1989 | Smith | |
| 4,913,657 | A | * | 4/1990 | Naito et al. | 439/192 |
| 5,029,613 | A | | 7/1991 | Smith, III | |
| 5,051,103 | A | * | 9/1991 | Neuroth | 439/192 |
| 5,099,882 | A | | 3/1992 | Smith, III | |
| 5,203,374 | A | | 4/1993 | Smith, III | |
| 5,219,298 | A | * | 6/1993 | Morin et al. | 439/192 |
| 5,221,214 | A | * | 6/1993 | Martin | 439/191 |

(Continued)

FOREIGN PATENT DOCUMENTS

DE 295 16 024 U1 8/1996

(Continued)

OTHER PUBLICATIONS

Search report received in corresponding application No. GB0717438.6 dated Jan. 10, 2008/.

*Primary Examiner*—David E Bochna
(74) *Attorney, Agent, or Firm*—Wong, Cabello, Lutsch, Rutherford & Brucculeri, LLP

(57) ABSTRACT

A female hydraulic coupling member and/or a male hydraulic coupling member is equipped with an electrically conductive contactor which contacts the opposing coupling member when the coupling is fully made up thereby electrically bonding the coupling members.

42 Claims, 10 Drawing Sheets

U.S. PATENT DOCUMENTS

| | | | |
|---|---|---|---|
| 5,284,183 A | 2/1994 | Smith, III | |
| 5,339,861 A | 8/1994 | Smith, III | |
| 5,355,909 A | 10/1994 | Smith, III | |
| 5,658,159 A * | 8/1997 | Gardner et al. | 439/294 |
| 5,979,499 A | 11/1999 | Smith | |
| 6,123,103 A | 9/2000 | Smith, III. | |
| 6,179,002 B1 | 1/2001 | Smith, III | |
| 6,290,079 B1 * | 9/2001 | Altherr | 213/1.3 |
| 6,383,000 B1 * | 5/2002 | Burd et al. | 439/192 |
| 6,575,430 B1 | 6/2003 | Smith, III | |
| 6,685,491 B2 * | 2/2004 | Gergek | 439/191 |
| 6,783,379 B2 * | 8/2004 | Kerscher et al. | 439/191 |
| 6,848,924 B2 * | 2/2005 | Frisch | 439/191 |
| 6,923,476 B2 | 8/2005 | Smith, III | |
| 6,962,347 B2 | 11/2005 | Smith, III | |
| 7,021,677 B2 | 4/2006 | Smith, III | |
| 7,156,676 B2 * | 1/2007 | Reynolds, Jr. | 439/194 |
| 7,226,090 B2 * | 6/2007 | Hughes | 285/330 |
| 7,404,725 B2 * | 7/2008 | Hall et al. | 439/194 |
| 2004/0256127 A1 | 12/2004 | Brenner et al. | |
| 2005/0029749 A1 | 2/2005 | Smith, III | |

FOREIGN PATENT DOCUMENTS

| | | |
|---|---|---|
| GB | 1 482 125 | 8/1997 |

* cited by examiner

HYDRAULIC COUPLING MEMBER WITH ELECTRICAL BONDING CONTRACTOR

CROSS-REFERENCE TO RELATED APPLICATIONS

None

STATEMENT REGARDING FEDERALLY SPONSORED RESEARCH OR DEVELOPMENT

None

BACKGROUND OF THE INVENTION

1. Field of the Invention

This invention relates to hydraulic couplings. More particularly, it relates to undersea hydraulic couplings used in systems which employ electrical bonding of components.

2. Description of the Related Art

A wide variety of undersea hydraulic couplings are available. Some couplings employ metal seals. Examples of undersea hydraulic couplings having metal seals include U.S. Pat. No. 4,694,859 for "Undersea hydraulic coupling and metal seal" U.S. Pat. No. 4,817,668 for "Integral metal seal for hydraulic coupling" U.S. Pat. No. 4,884,584 for "Internally preloaded metal-to-metal seal hydraulic connector" U.S. Pat. No. 5,029,613 for "Hydraulic coupler with radial metal seal" U.S. Pat. Nos. 5,099,882 and 5,203,374 for "Pressure balanced hydraulic coupling with metal seals" U.S. Pat. No. 5,284,183 for "Hydraulic coupler with radial metal seal" U.S. Pat. No. 5,339,861 for "Hydraulic coupling with hollow metal o-ring seal" U.S. Pat. No. 5,355,909 for "Undersea hydraulic coupling with metal seals" U.S. Pat. No. 5,979,499 for "Undersea hydraulic coupling with hollow metal seal" U.S. Pat. No. 6,962,347 for "Metal backup seal for undersea hydraulic coupling" and U.S. Pat. No. 7,021,677 for "Seal retainer with metal seal members for undersea hydraulic coupling" all to Robert E. Smith III and assigned to National Coupling Company of Stafford, Tex.

Other undersea hydraulic couplings employ only "soft seals"—i.e., non-metal seals that are typically formed of an elastomeric polymer ("elastomer") or an engineering plastic capable of being machined such as polyetheretherketone ("PEEK") or DELRIN® acetal resin.

By way of example, U.S. Pat. No. 6,123,103 discloses a pressure balanced hydraulic coupling for use in undersea drilling and production operations. The coupling has radial passages connecting between the male and female members such that fluid pressure is not exerted against the face of either member during coupling or uncoupling. The female member has a split body with a first part and a second part, each having a longitudinal passage and a radial fluid passage. A radial seal is positioned on the junction between the first and second parts of the female member body to facilitate removal and replacement of the radial seal when the split body is disassembled. The male member may be inserted through the first and second parts of the female coupling member, thereby establishing fluid communication between the coupling members in a direction transverse to the coupling member bores.

U.S. Pat. No. 6,179,002 discloses an undersea hydraulic coupling having a radial pressure-energized seal with a dovetail interfit with the coupling body. The seal has a pair of flexible sealing surfaces for sealing with the male and female coupling members and a cavity therebetween that is exposed to fluid pressure in the coupling. The outer circumference of the seal has a dovetail interfit between inclined shoulders in the female member bore and on a seal retainer that holds the seal in the bore.

U.S. Pat. No. 6,575,430 discloses an undersea hydraulic coupling member having a ring-shaped seal with multiple sealing surfaces extending radially inwardly therefrom. The multiple sealing surfaces help guide the probe of the male coupling member into the female member without the risk of drag or galling of the receiving chamber. The seal has an interfit with reverse inclined shoulders in the female member to restrain the seal from moving radially inwardly due to vacuum or low pressure. Attention is invited in particular to the embodiments shown in FIGS. 8 and 9 of this patent.

U.S. Pat. No. 6,923,476 discloses a floating seal for an undersea hydraulic coupling member that is moveable radially to seal with the male coupling member even if there is some misalignment with the female coupling member. The floating seal is restricted from axial movement within the female coupling member receiving chamber. The floating seal may seal with the female coupling member.

U.S. Patent Application Publication No. US 2005/0029749 discloses an undersea hydraulic coupling member having a bore liner that protects the coupling members from galling during assembly or disassembly. The bore liner is removable from the bore of a female undersea hydraulic coupling member. The bore liner may be integral with a seal section that may seal with a male undersea hydraulic coupling member. The bore liner also may have an outer diameter configured to engage and interlock with the bore in which the bore liner is positioned. In certain embodiments, the bore liner is fabricated from PEEK.

Bonding refers to the connection of all metal objects such as pipes, conduits and structural steel together to form an equipotential zone. Often, bonding includes an electrical connection to earth (ground potential). To remove dangerous voltage from ground faults, metal parts of electrical raceways, cables, enclosures, and equipment must be bonded to an effective ground-fault current path with an equipment grounding (bonding) conductor of a suitable type.

Equipment bonding provides an effective electrically continuous path in an effort to conduct stray voltage/current safely to ground. The National Electrical Code also states that it is good practice to bond all metallic systems and objects.

Bonding requirements and tests are intended to ensure that a system or facility is free from such hazards as electrical shock and static discharge. In addition, bonding requirements provide for reliable fault clearing paths and the suppression of electromagnetic interference (EMI). A typical bonding requirement might require that the chassis or structure of all equipment which is operating from a common power source shall be bonded such that maximum electrical fault currents can be conducted without creating a thermal or electrical hazard and that electrical bonds between all equipment shall be made to minimize differences in potential.

Bonding reduces electrostatic EMI by preventing the build-up and subsequent discharge of static charges. Bonding prevents surfaces from electrically resonating and radiating EMI. Bonding eliminates harmonic EMI by eliminating current rectification at contact surfaces. Bonding assures that all parts are at the same potential which prevents higher RF current flow in one part of the structure than another.

Cathodic protection is a technique used to control the corrosion of a metal surface by making that surface the cathode of an electrochemical cell. Cathodic protection systems are most commonly used to protect steel structures, water and fuel pipelines and storage tanks; steel pier piles, ships, offshore oil platforms and onshore oil well casings. Cathodic protection is an effective method of preventing stress corrosion cracking.

Galvanic or sacrificial anodes are made in various shapes typically using alloys of zinc, magnesium and aluminum. The electrochemical potential, current capacity, and consumption rate of these alloys are advantageous for cathodic protection.

Galvanic anodes are designed and selected to have a more negative electrochemical potential than the metal of the structure (typically steel). For effective cathodic protection, the potential of the steel surface is polarized more negative until the surface has a uniform potential. At that stage, the driving force for the corrosion reaction is halted. The galvanic anode continues to corrode, consuming the anode material until eventually it must be replaced. The polarization is caused by the current flow from the anode to the cathode. The driving force for the cathodic protection current flow is the difference in electrochemical potential between the anode and the cathode.

For larger structures, galvanic anodes cannot economically deliver enough current to provide complete protection. Impressed Current Cathodic Protection (ICCP) systems use anodes connected to a DC power source (a cathodic protection rectifier). Anodes for ICCP systems may be tubular and solid rod shapes or continuous ribbons of various specialized materials. These include high silicon cast iron, graphite, mixed metal oxide, platinum and niobium coated wire and others. In any cathodic protection system, bonding is required to provide a current path and achieve a uniform surface potential.

Electrical bonding is not always assured in an hydraulic coupling. This is especially true if the coupling has only soft seals and no metal seals since the male probe may not make metal-to-metal contact with the body of the female member. Not all couplings employ poppet valves with their associate actuators which contact one another when the coupling is made up. Moreover, many hydraulic fluids are dielectrics— an electrical insulator—and a thin film of hydraulic fluid on the surface of a part may prevent electrical continuity with an adjacent part.

To remedy this situation, designers often specify bonding straps to provide a low-impedance electrical pathway from one side of a coupling to the other. Such straps may be connected to the coupling bodies with clamps or, in some cases, machine screws which fit into threaded holes in the coupling body. These devices however, significantly increase the work required to make up and disconnect a hydraulic coupling. Particularly in the undersea environment where such work must be performed by remotely operated vehicles (ROVs) this is a significant disadvantage. What is needed is a hydraulic coupling which automatically electrically bonds the male and female members together upon make up. The present invention solves this problem.

BRIEF SUMMARY OF THE INVENTION

An hydraulic coupling member is equipped with an electrical contactor which assures electrical bonding to a mating coupling member. The electrical contactor may be a part of a male and/or a female coupling member.

A bonding device according to the present invention may comprise an electrically conductive resilient member housed partially within a cavity on the leading face of the coupling member and projecting therefrom. In a first embodiment, the contactor is formed from a portion of the resilient member. In a second embodiment, the contactor and resilient member are separate elements in electrical contact with one another and with the body of the coupling member. When the coupling is made up, the contactor at least partially retracts into the cavity so as to avoid interfering with full engagement of the coupling members.

In certain embodiments, the bonding device is incorporated into a seal retainer nut or cartridge seal member. In such embodiments, the invention may be retrofitted to existing female coupling members without the need for machining of the coupling body.

BRIEF DESCRIPTION OF THE SEVERAL VIEWS OF THE DRAWING(S)

DETAILED DESCRIPTION OF THE INVENTION

Figure 1:
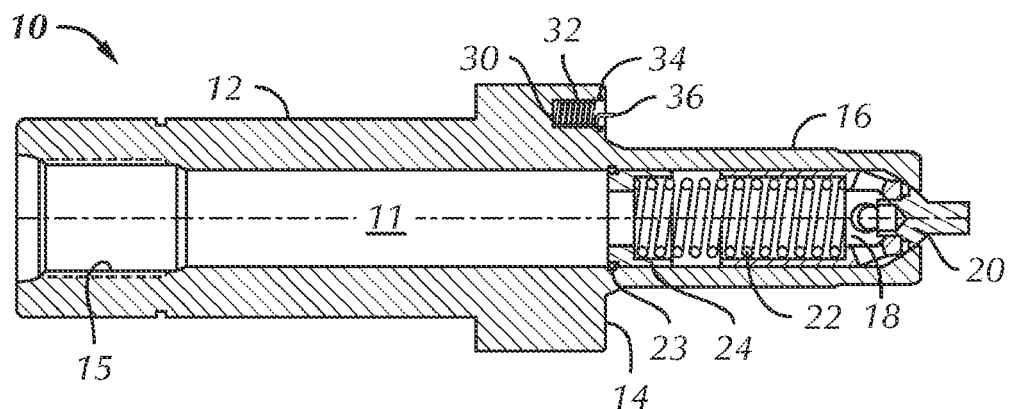
FIG. 1 is a cross-sectional view of a first type of male hydraulic coupling member having a bonding device according to a first embodiment.

The invention may best be understood by reference to various embodiments thereof. FIG. 1 depicts a male hydraulic coupling member 10 comprised of body 12 and probe 16. Central axial bore 11 passes through body 12 and probe 16 providing a flow channel for hydraulic fluid. When male coupling member 10 is connected to a corresponding female coupling member, leading face 14 of body section 12 abuts or is proximate a corresponding surface on the female member.

The male coupling illustrated in FIG. 1 includes a poppet valve 18 within probe section 16. Poppet valve 18 includes actuator 20 which bears against a corresponding actuator in the female member when the coupling members are joined thereby opening the poppet valve 18. Poppet spring 22 bears against spring seat 24 within bore 11 to urge poppet valve 18 to the closed position. Spring seat 24 may be retained in bore 11 by clip 23 which may engage a groove in the wall of internal bore 11.

Generally cylindrical cavity 30 in leading face 14 is a generally planar shoulder on the end of the body of male body 12 adjacent the probe and is sized to accommodate bonding device 32. In the embodiment illustrated in FIG. 1, bonding device 32 comprises a helically-wound, electrically conductive compression spring, the external end of which is formed into projection 36. Bonding spring 32 is retained within cavity 30 by keeper 34 which may be a snap ring in a groove in the wall of cylindrical cavity 30.

Contact point 36 preferably has a sharp projection (e.g., conical, wedge-shaped or pyramidal) to pierce any contamination or corrosion on the abutting face of the female member and thereby establish a low-resistance electrical path between the two coupling members.

Bonding spring 32 may be fabricated using any suitable resilient, electrically-conductive material. For use in the subsea environment, non-corrosive materials are preferred examples of which include stainless steel, Inconel, and brass.

In use, contact point 36 makes electrical contact with the body of the female member when the two members are joined. As male probe 16 is inserted fully into the receiving chamber of the corresponding female member, bonding device 32 is urged into cavity 30 as point 36 makes contact with the leading face of the female member. In this way bonding device 32 does not interfere with complete make up of the coupling members while still providing for a reliable electrical connection. If electrically conductive hydraulic lines are used, an electrically bonded system may be achieved. Hydraulic lines may be connected to the end of coupling 10 opposite probe 16 using internally threaded connector 15 to provide both a fluid-tight and electrically conductive connection.

Figure 2:
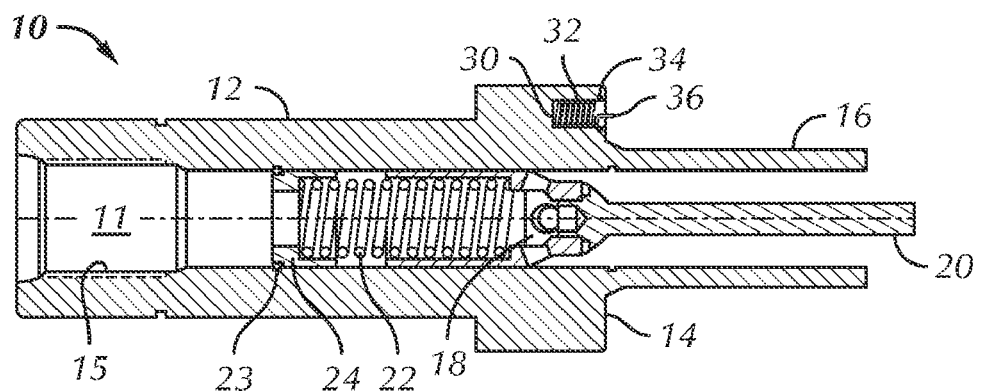
FIG. 2 is a cross-sectional view of a second type of male hydraulic coupling member having a bonding device according to a first embodiment.

FIG. 2 shows a male coupling member 10 having poppet valve 18 within body 12. Poppet actuator extends through probe section 16 and hydraulic fluid may flow through the annulus between the interior of probe section 16 and the external side surface of actuator 20. In other respects, the coupling shown in FIG. 2 has parts corresponding to those in the embodiment of FIG. 1 and like reference numbers are used to identify the elements.

Figure 3:
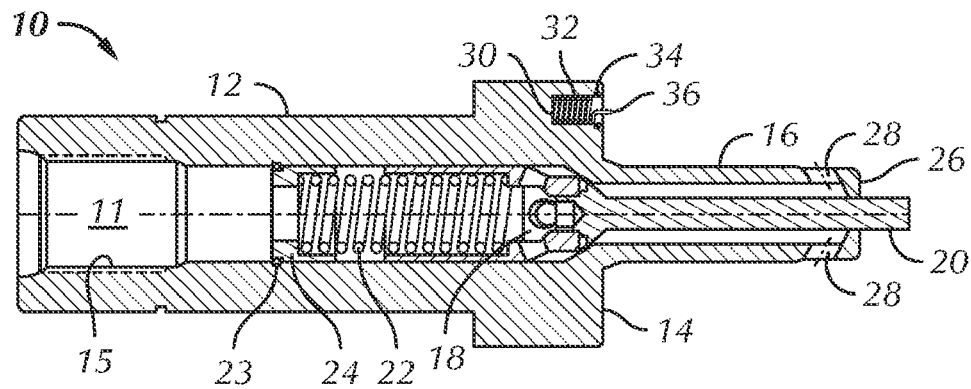
FIG. 3 is a cross-sectional view of a third type of male hydraulic coupling member having a bonding device according to a first embodiment.

FIG. 3 illustrates a male coupling member 10 having poppet 18 within body section 12 similar to the embodiment shown in FIG. 2. In this embodiment, however, front face 26 of male probe 16 has an opening sized to fit poppet actuator 20 in sliding engagement. Anti-fouling ports 28 are provided in the sides of probe section 16 for the flow of hydraulic fluid into or out of the annulus between the interior wall of probe 16 and valve actuator 20. Ports 28 are preferably angled as shown in FIG. 3. In use, male hydraulic coupling members are often vertically oriented in the subsea environment. When the male coupling is not mated to a corresponding female coupling member, the male probe is subject to fouling and contamination from debris settling towards the ocean floor. Angled ports 28 resist fouling by reason of being angled downward, away from the settling path of most debris. Debris is therefore less likely to enter the annulus within the probe section 16 and foul the connector.

Figure 4:
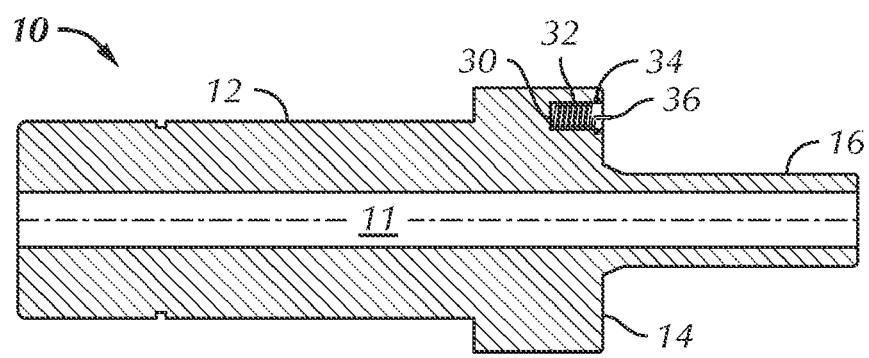
FIG. 4 is a cross-sectional view of a fourth type of male hydraulic coupling member having a bonding device according to a first embodiment.

A male coupling member 10 that has no internal poppet valve is shown in FIG. 4. Bonding device 32 according to the first embodiment thereof is shown within cavity 30 retained by keeper 34. A coupling of this type benefits particularly from the present invention inasmuch as there are no poppet actuators to contact one another during coupling make up and thereby potentially establish an electrical path through the coupling.

FIGS. 5 through 8, inclusive, illustrate male coupling members 10 having a bonding device according to a second embodiment of the invention. In this embodiment, contactor 40 has a generally cylindrical body with projecting ring 38 and generally conical contact point 37. A first shoulder between projecting ring 38 and the main body portion of contactor 40 contacts keeper 34 to retain contactor 40 in cylindrical cavity 30. Keeper 34 may be a snap ring retained in a groove in the side wall of cavity 30. A second shoulder between projecting ring 38 and the main body portion of contactor 40 bears against resilient member 33 which acts to urge contactor 40 out of cavity 30. In the illustrated embodiment, resilient member 33 is a helically-wound, electrically conductive spring. Resilient member 33 may take other forms—e.g., an elastomeric polymer having a conductive filler. In use, point 37 contacts the leading face of a corresponding female member when the coupling is made up. Contactor 40 retracts into cavity 30 compressing resilient member 33 as probe 16 is inserted fully into the receiving chamber of the female member. In this way, bonding device 40 does not interfere with full make up of the connection. The sharp point 37 of contactor 40 is designed to penetrate surface contamination or corrosion on the female member body and create an electrical pathway through the coupling.

Figure 5:
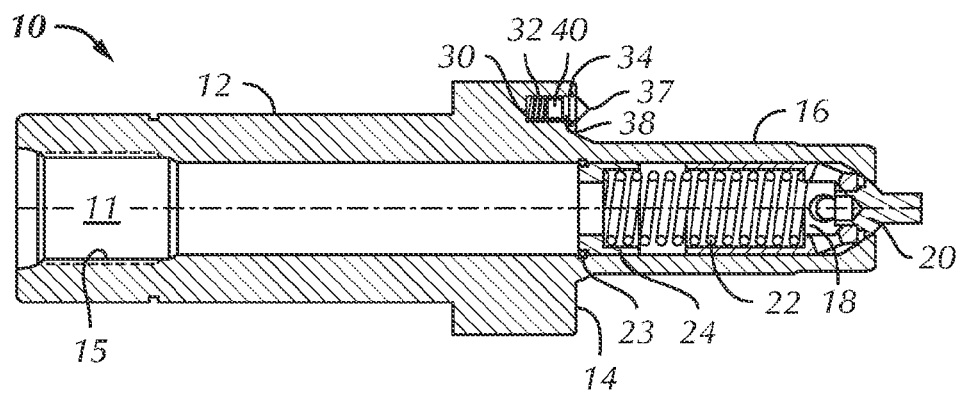
FIG. 5 is a cross-sectional view of a first type of male hydraulic coupling member having a bonding device according to a second embodiment.

FIG. 5 illustrates a male coupling 10 having a bonding contactor 40 according to the second embodiment of the invention and poppet valve 18 in probe section 16 similar to the coupling shown in FIG. 1 and like reference numbers are used for corresponding elements.

Figure 6:
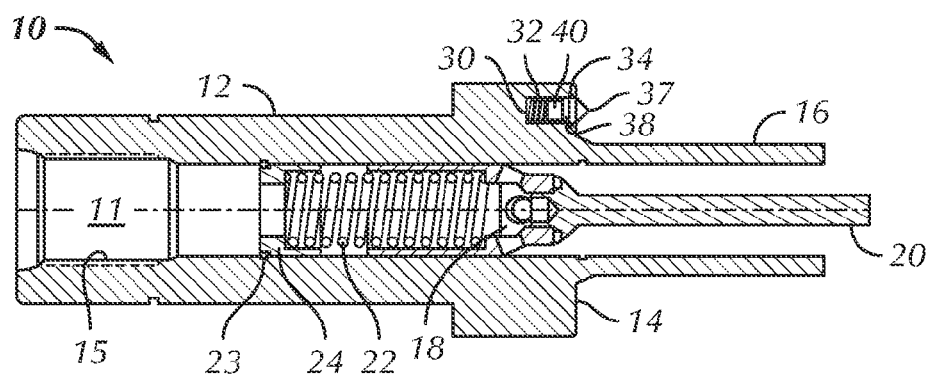
FIG. 6 is a cross-sectional view of a second type of male hydraulic coupling member having a bonding device according to a second embodiment.

FIG. 6 illustrates a male coupling 10 having a bonding contactor 40 according to the second embodiment of the invention and poppet valve 18 in body section 12 similar to the coupling shown in FIG. 2 and like reference numbers are used for corresponding elements.

Figure 7:
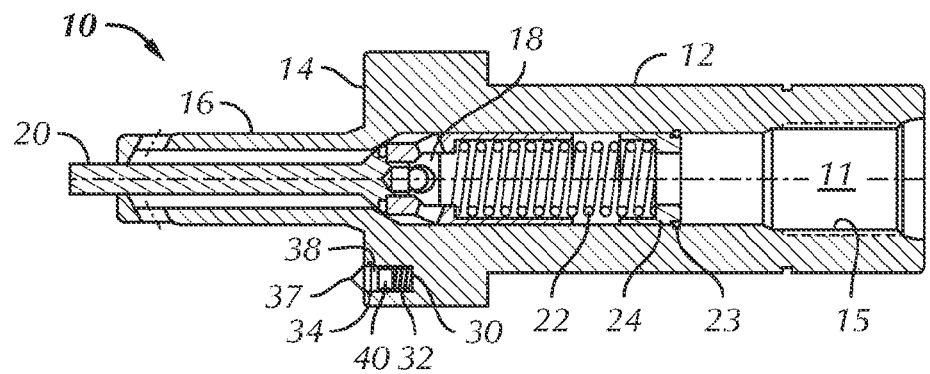
FIG. 7 is a cross-sectional view of a third type of male hydraulic coupling member having a bonding device according to a second embodiment.

FIG. 7 illustrates a male coupling 10 having a bonding contactor 40 according to the second embodiment of the invention and a probe section 16 with anti-fouling ports 28 similar to the coupling shown in FIG. 3 and like reference numbers are used for corresponding elements.

Figure 8:
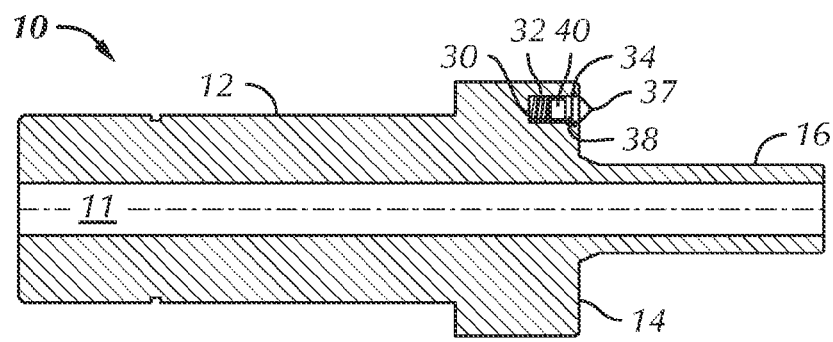
FIG. 8 is a cross-sectional view of a fourth type of male hydraulic coupling member having a bonding device according to a second embodiment.

FIG. 8 illustrates a male coupling 10 having a bonding contactor 40 according to the second embodiment of the invention and no poppet valve in central bore 11 similar to the coupling shown in FIG. 4 and like reference numbers are used for corresponding elements.

Figure 9:
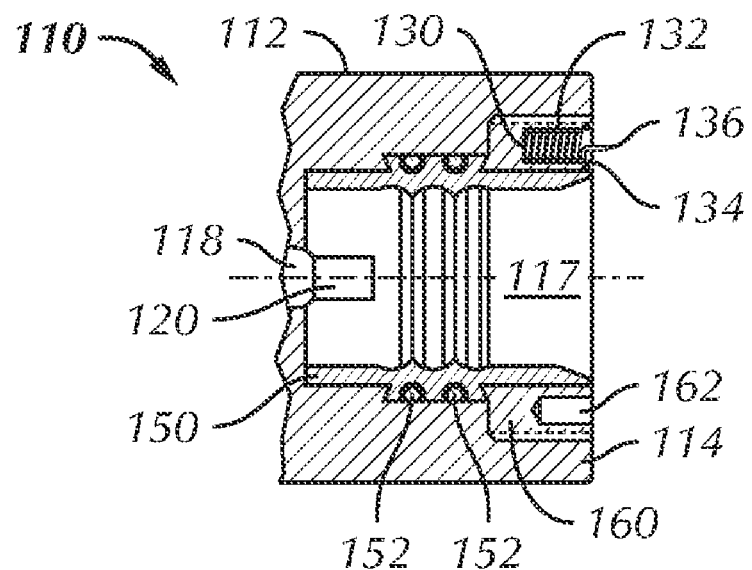
FIG. 9 is a cross-sectional view of a portion of a female hydraulic coupling member having a bonding device according to a first embodiment.

A portion of a female coupling member having a bonding device 132 according to the first embodiment of the invention is shown in FIG. 9. Female coupling body 112 has a central axial bore, one end of which forms receiving chamber 117 into which the probe section of a corresponding male member fits. Female coupling 110 may include optional poppet valve 118 having poppet actuator 120 which opens poppet valve 118 when contacted by a corresponding actuator 20 in a male member 10.

Female member 110 includes polymeric seal and bore liner 150 which lines receiving chamber 117 to prevent galling and provides a fluid-tight seal to the probe section of the male member. Seal and bore liner 150 may include O-ring seals 152 to seal between seal and bore liner 150 and the body 112 of female coupling 110. Bore liner 150 with integral seal section is fully disclosed in U.S. Patent Application Publication No. US 2005/0029749 which is incorporated by reference in its entirety.

Externally threaded retainer nut 160 may retain seal and bore liner 150 in receiving chamber 117. A pair of angled shoulders on the external surface of bore liner 150 may form a dovetail interfit to provide resistance to implosion of seal and bore liner 150 into receiving chamber 117 when the male probe is withdrawn. A portion of the central axial bore of female member 110 proximate mating face 114 may be internally threaded to engage retainer nut 160. Spanner engagement holes 162 may be provided in the face of retainer nut 160 to facilitate engagement and disengagement of retainer nut 160 in female body 112.

Generally cylindrical cavity 130 in the external face of retainer nut 160 is sized to accommodate bonding device 132. In the embodiment illustrated in FIG. 9, bonding device 132 comprises a helically-wound, electrically conductive compression spring, the external end of which is formed into projection 136. Bonding spring 132 is retained within cavity 130 by keeper 134 which may be a snap ring in a groove in the wall of cylindrical cavity 130.

Contact point 136 preferably has a sharp projection (e.g., conical, wedge-shaped or pyramidal) to pierce any contamination or corrosion on the abutting face of the male member and thereby establish a low-resistance electrical path between the two coupling members.

Bonding spring 132 may be fabricated using any suitable resilient, electrically-conductive material. For use in the subsea environment, non-corrosive materials are preferred examples of which include stainless steel, Inconel, and brass.

In use, contact point 136 makes electrical contact with the body of the male member when the two members are joined. As the probe section of the male member is inserted fully into the receiving chamber 117 of the female member 110, bonding device 132 is urged into cavity 130 as point 136 makes contact with the leading face of the male member. In this way bonding device 132 does not interfere with complete make up of the coupling members while still providing for a reliable electrical connection. If electrically conductive hydraulic lines are used, an electrically bonded system may be achieved.

Figure 10:
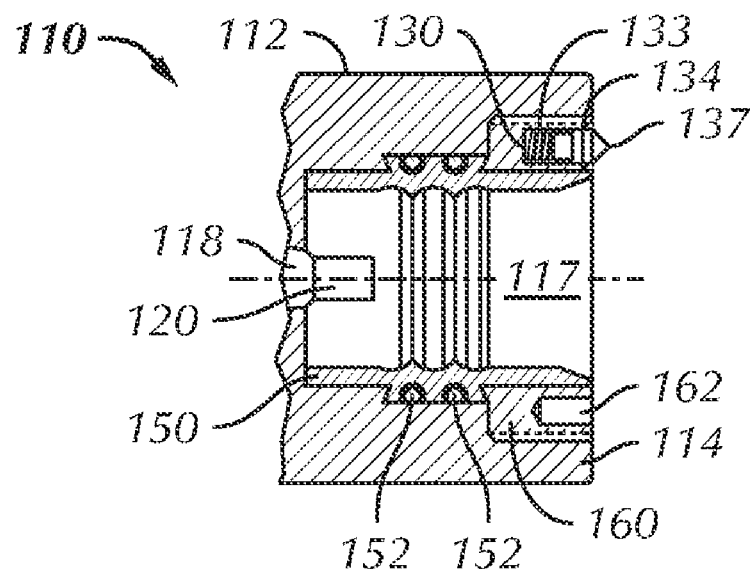
FIG. 10 is a cross-sectional view of a portion of a female hydraulic coupling member having a bonding device according to a second embodiment.

FIG. 10 shows a portion of a female coupling 110 of the type shown in FIG. 9 and described above. This coupling, however, has a bonding contactor 140 according to a second embodiment of the invention. In this embodiment, contactor 140 has a generally cylindrical body with projecting ring 138 and generally conical contact point 137. A first shoulder between projecting ring 138 and the main body portion of contactor 140 contacts keeper 134 to retain contactor 140 in cylindrical cavity 130. Keeper 134 may be a snap ring retained in a groove in the side wall of cavity 130. A second shoulder between projecting ring 138 and the main body portion of contactor 140 bears against resilient member 133 which acts to urge contactor 140 out of cavity 130. In the illustrated embodiment, resilient member 133 is a helically-wound, electrically conductive spring. Resilient member 133 may take other forms—e.g., an elastomeric polymer having a conductive filler. In use, point 137 contacts the leading face of a corresponding male member when the coupling is made up. Contactor 140 retracts into cavity 130 compressing resilient member 133 as the probe section of the male member is inserted fully into receiving chamber 117 of female member 110. In this way, bonding device 140 does not interfere with full make up of the connection. The sharp point 137 of contactor 140 is designed to penetrate surface contamination or corrosion on the male member body and create an electrical pathway through the coupling.

Figure 11:
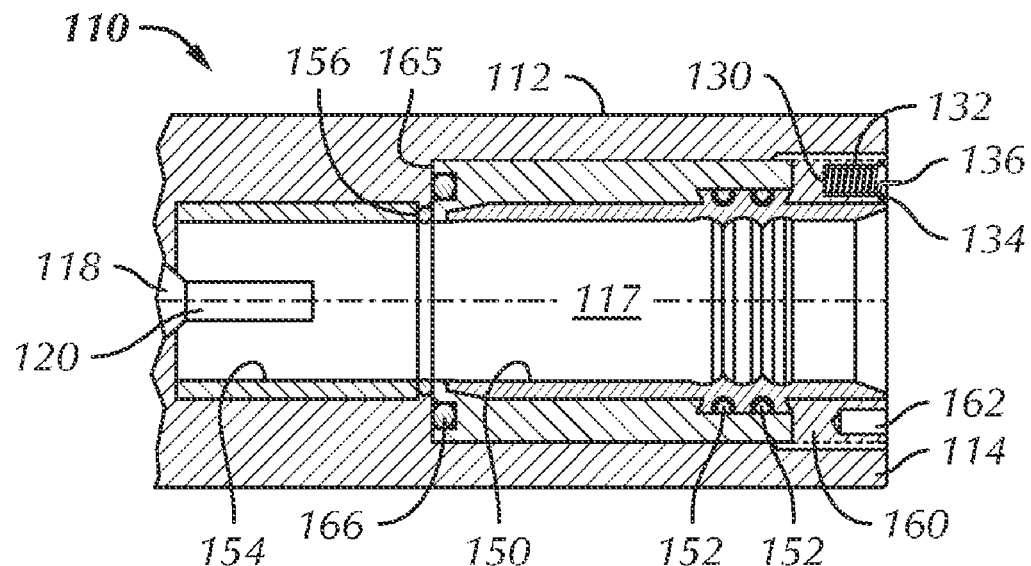
FIG. 11 is a cross-sectional view of a portion of a female hydraulic coupling member equipped with a seal retainer and a two-piece bore liner and having a bonding device according to a first embodiment.

FIG. 11 shows a portion of a female coupling member 110 having seal retainer 164 which is held against shoulder 165 in the central bore 117 by threaded retainer nut 160. This type of seal retainer is fully disclosed in U.S. Pat. No. 4,900,071 entitled "Undersea hydraulic coupling with dovetail seal" which is hereby incorporated by reference in its entirety. O-ring seal 166 is held in an annular groove in the inner face of seal retainer 164 to provide a fluid seal between seal retainer 164 and female body 112.

The inner portion of receiving chamber 117 is lined by polymeric bore liner 154. Metal C-seal 156 which may be a pressure-energized seal is retained in the bore between the distal end of bore liner 154 and seal retainer 164.

Bonding device 132 is housed in cavity 130 within retainer nut 160. This bonding device is of the type according to the first embodiment of the invention described above in connection with the female coupling illustrated in FIG. 9.

Figure 12:
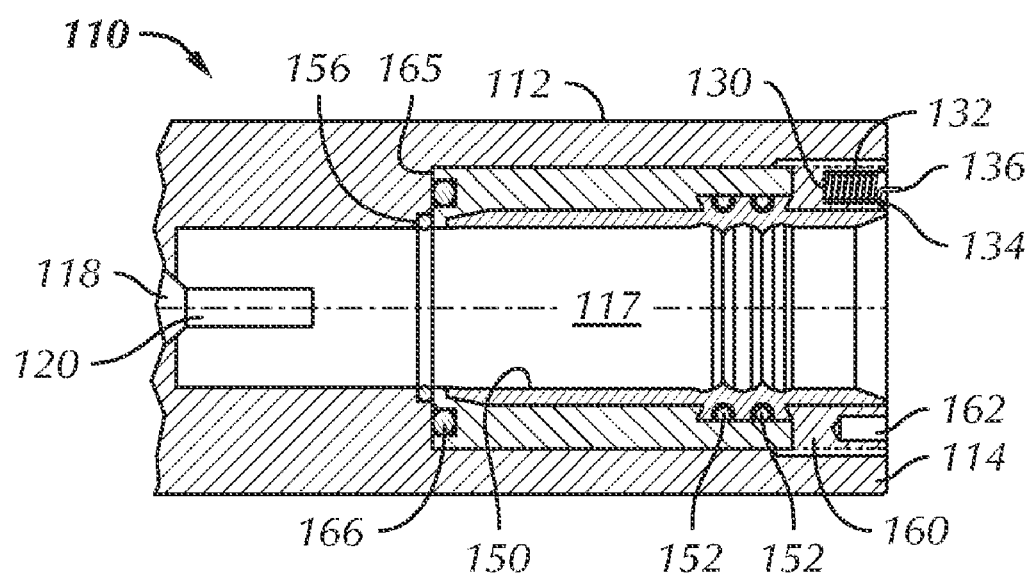
FIG. 12 is a cross-sectional view of a portion of a female hydraulic coupling member equipped with a seal retainer and a partial bore liner and having a bonding device according to a first embodiment.

FIG. 12 illustrates a portion of a female coupling member 110 having a seal retainer 164 of the type shown in FIG. 11 but without the bore liner in the portion of the receiving chamber 117 proximate the poppet valve 118. In this embodiment, metal C-seal 156 is retained between a second shoulder in the central bore and seal retainer 164. Bonding device 132 in retainer nut 160 is according to the first embodiment of the invention and like reference numbers are used to identify the corresponding elements.

Figure 13:
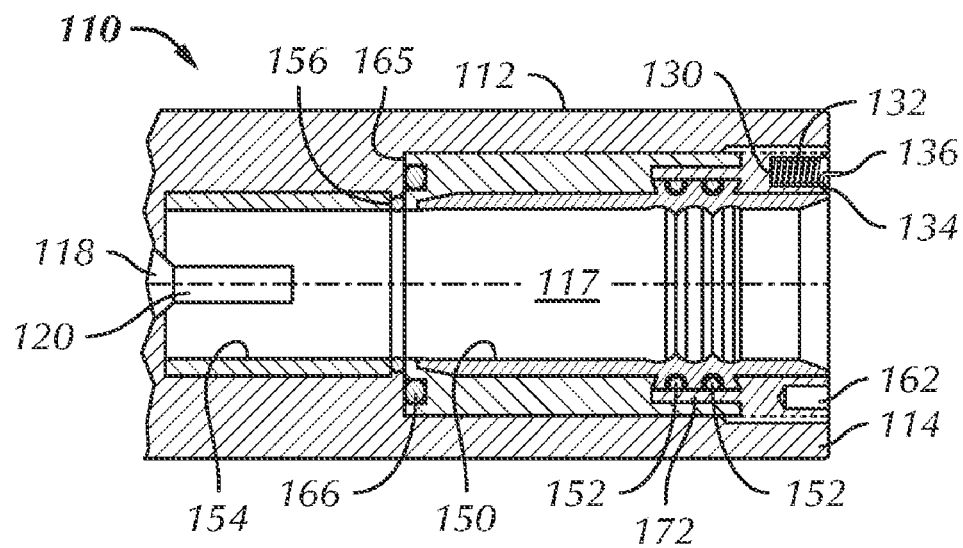
FIG. 13 is a cross-sectional view of a portion of a female hydraulic coupling member equipped with a cartridge-type seal retainer and a two-piece bore liner and having a bonding device according to a first embodiment.

FIG. 13 illustrates a portion of a female coupling member having a cartridge-type seal retainer comprised of outer shell 170 and inner shell 172. This type of seal retainer is fully disclosed in U.S. Pat. Nos. 7,063,328 and 7,021,677 which are both hereby incorporated by reference in their entireties. A two-part bore liner includes sleeve 154 and seal section 150. Metal C-seal 156 is retained between sleeve 154 and the inner end of outer shell 170 of the seal retainer. Bonding device 132 is according to the first embodiment of the invention discussed above. Like reference numbers are used throughout the drawing figures.

Figure 14:
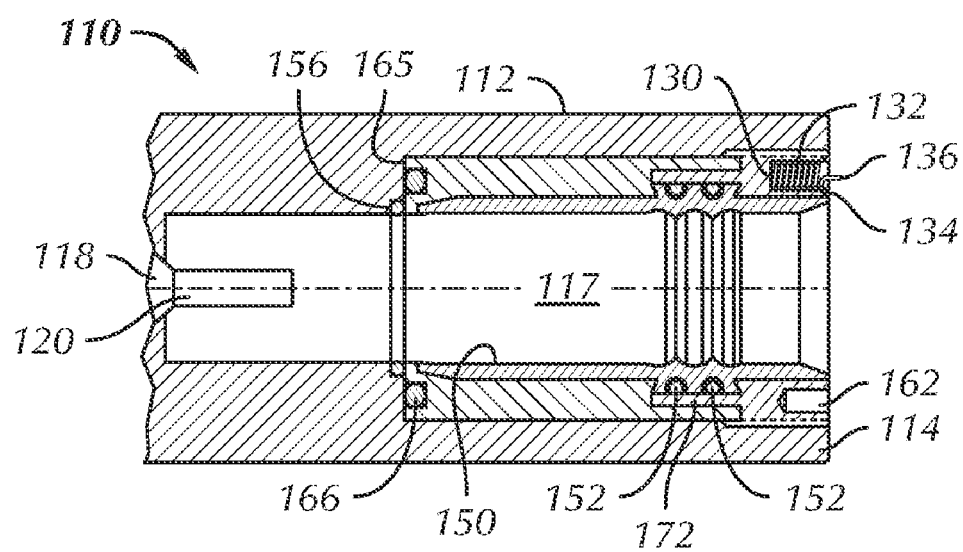
FIG. 14 is a cross-sectional view of a portion of a female hydraulic coupling member equipped with a cartridge-type seal retainer and a partial bore liner and having a bonding device according to a first embodiment.

FIG. 14 shows a portion of a female coupling member 110 having the same style of cartridge-type seal retainer as that shown in FIG. 13. In this embodiment, the inner portion of the receiving chamber 117 is unlined. Metal C-seal 156 is retained between a second shoulder in the internal bore and the inner face of the seal retainer's outer shell 170. Bonding contactor 132 is according to the first embodiment of the invention and like reference numbers are used to identify the elements thereof.

Figure 15:
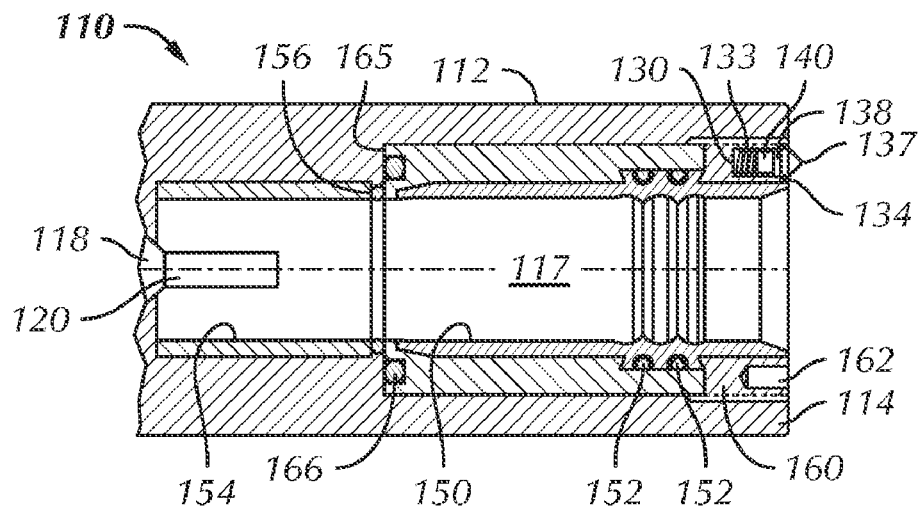
FIG. 15 is a cross-sectional view of a portion of a female hydraulic coupling member equipped with a seal retainer and a two-piece bore liner and having a bonding device according to a second embodiment.

FIG. 15 shows a portion of a female coupling member 110 having seal retainer 164 which is held against shoulder 165 in the central bore 117 by threaded retainer nut 160. The coupling member is of the type illustrated in FIG. 11 and described above. O-ring seal 166 is held in an annular groove in the inner face of seal retainer 164 to provide a fluid seal between seal retainer 164 and female body 112.

The inner portion of receiving chamber 117 is lined by polymeric bore liner 154. Metal C-seal 156 which may be a pressure-energized seal is retained in the bore between the distal end of bore liner 154 and seal retainer 164.

Bonding contactor 140 is housed in cavity 130 within retainer nut 160. This bonding device is of the type according to the second embodiment of the invention described above in connection with the female coupling illustrated in FIG. 10.

Figure 16:
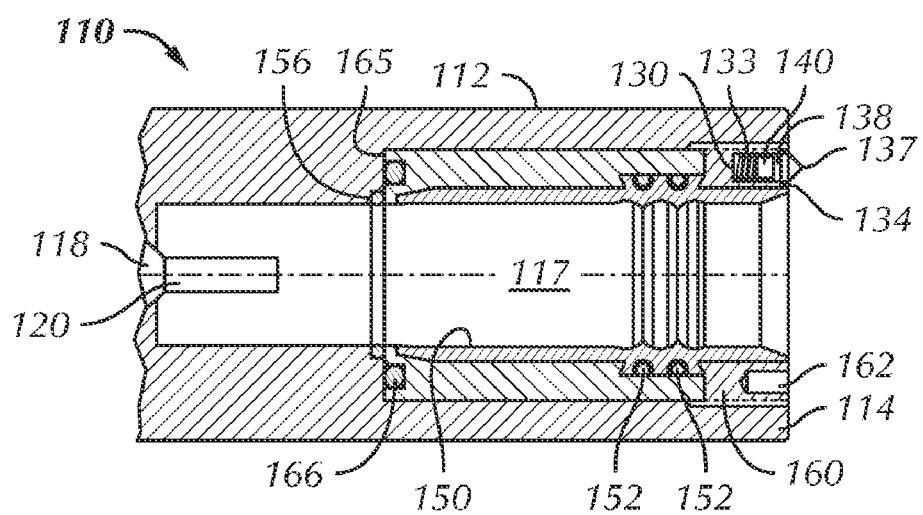
FIG. 16 is a cross-sectional view of a portion of a female hydraulic coupling member equipped with a seal retainer and a partial bore liner and having a bonding device according to a second embodiment.

FIG. 16 illustrates a portion of a female coupling member 110 having a seal retainer 164 of the type shown in FIG. 16 but without the bore liner in the portion of the receiving chamber 117 proximate the poppet valve 118. In this embodiment, metal C-seal 156 is retained between a second shoulder in the central bore and seal retainer 164. Bonding contactor 140 in retainer nut 160 is according to the second embodiment of the invention and like reference numbers are used to identify the corresponding elements.

Figure 17:
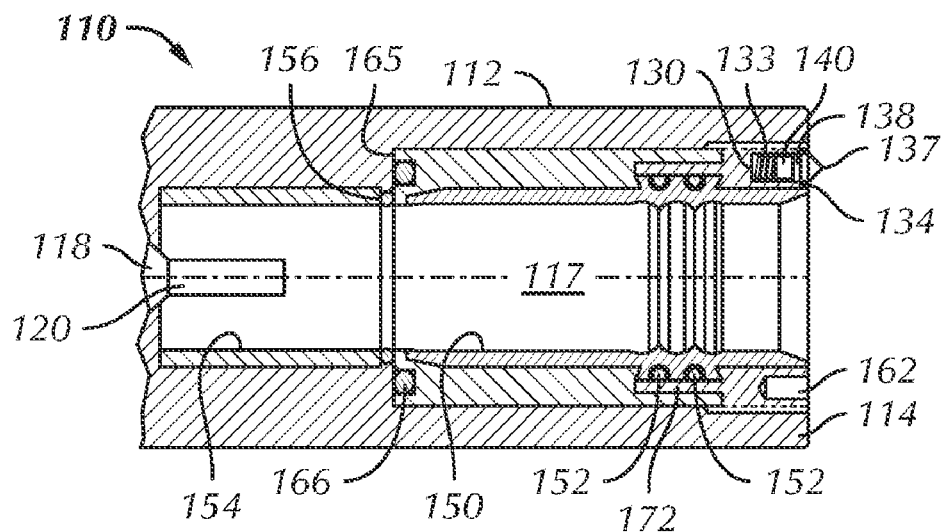
FIG. 17 is a cross-sectional view of a portion of a female hydraulic coupling member equipped with a cartridge-type seal retainer and a two-piece bore liner and having a bonding device according to a second embodiment.

FIG. 17 illustrates a portion of a female coupling member having a cartridge-type seal retainer comprised of outer shell 170 and inner shell 172. This type of coupling is illustrated in FIG. 13 and discussed above. A two-part bore liner includes sleeve 154 and seal section 150. Metal C-seal 156 is retained between sleeve 154 and the inner end of outer shell 170 of the seal retainer. Bonding contactor 140 is according to the second embodiment of the invention discussed above. Like reference numbers are used throughout the drawing figures.

Figure 18:
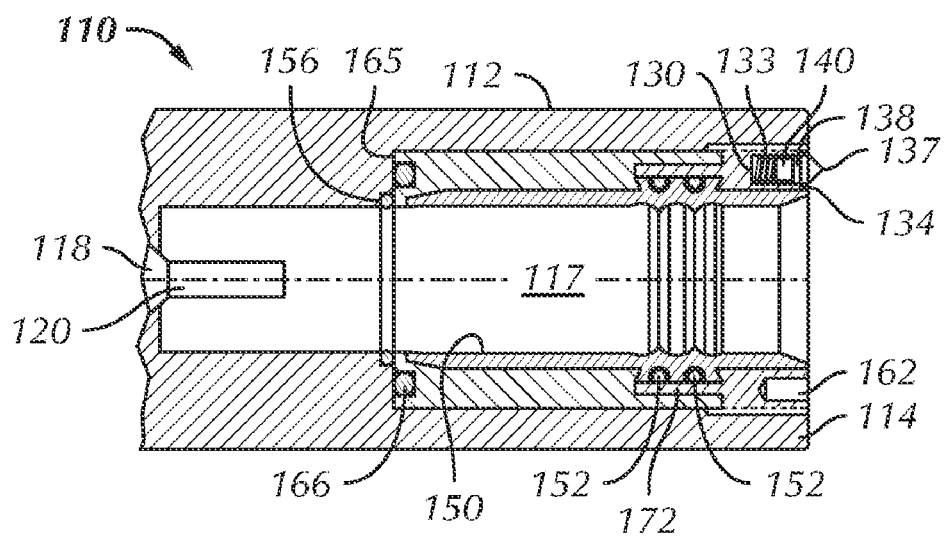
FIG. 18 is a cross-sectional view of a portion of a female hydraulic coupling member equipped with a cartridge-type seal retainer and a partial bore liner and having a bonding device according to a second embodiment.

FIG. 18 shows a portion of a female coupling member 110 having the same style of cartridge-type seal retainer as that shown in FIG. 17. In this embodiment, the inner portion of the receiving chamber 117 is unlined. Metal C-seal 156 is retained between a second shoulder in the internal bore and the inner face of the seal retainer's outer shell 170. Bonding contactor 140 is according to the second embodiment of the invention and like reference numbers are used to identify the elements thereof.

Figure 19:
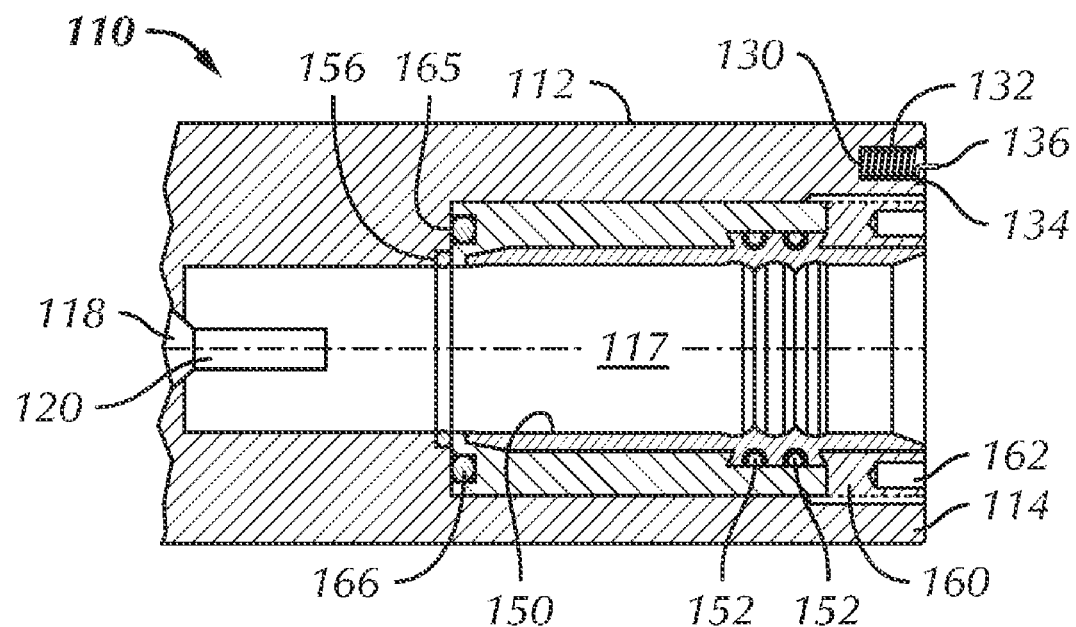
FIG. 19 is a cross-sectional view of a portion of a female hydraulic coupling member equipped with a seal retainer and a partial bore liner and having a bonding device according to a first embodiment located in the body of the coupling.

FIG. 19 illustrates a portion of a female coupling member 110 having a seal retainer 164 of the type shown in FIG. 12 and like reference numbers are used to identify the corresponding elements. In this embodiment, metal C-seal 156 is retained between a second shoulder in the central bore and seal retainer 164. Bonding device 132 according to the first embodiment of the invention is housed in cavity 130 in face 114 of body 112 and a conventional retainer nut 160 may be used.

Figure 20:
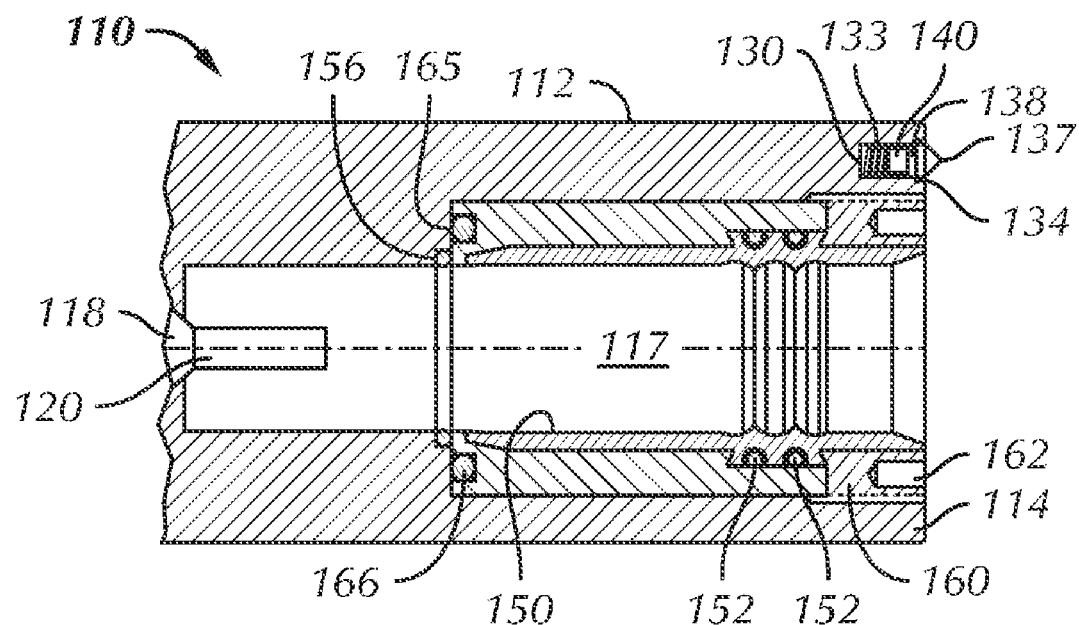
FIG. 20 is a cross-sectional view of a portion of a female hydraulic coupling member equipped with a seal retainer and a partial bore liner and having a bonding device according to a second embodiment located in the body of the coupling.

FIG. 20 illustrates a portion of a female coupling member 110 having a seal retainer 164 of the type shown in FIG. 16 and like reference numbers are used to identify the corresponding elements. In this embodiment, metal C-seal 156 is retained between a second shoulder in the central bore and seal retainer 164. Bonding device 132 according to the second embodiment of the invention is housed in cavity 130 in face 114 of body 112 and a conventional retainer nut 160 may be used.

Although electrical bonding may be achieved using a bonding device according to the present invention in either the male or the female coupling member, a coupling may comprise male and female members each having a bonding contactor. It will be appreciated by those skilled in the art that the invention may be retrofitted to existing coupling members. It is particularly convenient to retrofit female coupling members by simply replacing the seal retainer nut with a retainer nut according to the present invention. This may be accomplished by simply unscrewing the old retainer nut and replacing it with one incorporating a bonding contactor according to the present invention. No other modification to the coupling member is required. In particular, no machining is required and thus the retrofit may be readily accomplished on site and without special equipment.

Although the invention has been described in detail with reference to certain preferred embodiments, variations and modifications exist within the scope and spirit of the invention as described and defined in the following claims.

What is claimed is:

1. A male hydraulic coupling member comprising:
   a generally cylindrical metal body having a first end and a second end;
   a generally cylindrical probe connected to the first end of the body, the probe having a smaller diameter than the body;
   a generally planar shoulder on the first end of the body adjacent the probe;
   a cavity in the shoulder open to the first end;
   an electrically-conductive resilient member having a first end within the cavity and a second end projecting from the cavity, the resilient member being in electrical contact with the metal body.

2. A male hydraulic coupling member as recited in claim 1 wherein the electrically-conductive resilient member is a spring.

3. A male hydraulic coupling member as recited in claim 1 wherein the electrically-conductive resilient member is a helically-wound spring.

4. A male hydraulic coupling member as recited in claim 3 wherein the spring is fabricated from a metal selected from the group consisting of: stainless steel, Inconel and brass.

5. A male hydraulic coupling member as recited in claim 3 wherein the second end of the spring comprises a substantially right angle bend in the material forming the spring.

6. A male hydraulic coupling member as recited in claim 1 further comprising a keeper engaged to the wall of the cavity which limits the travel of the resilient member.

7. A male hydraulic coupling member as recited in claim 1 wherein the second end of the resilient member comprises a sharp point.

8. A male hydraulic coupling member as recited in claim 1 wherein the projecting end of the contactor comprises a sharp point.

9. A male hydraulic coupling member comprising:
   a generally cylindrical metal body having a first end and a second end;
   a generally cylindrical probe connected to the first end of the body, the probe having a smaller diameter than the body;
   a generally planar shoulder on the first end of the body adjacent the probe;
   a cavity in the shoulder open to the first end;

an electrically-conductive contactor having a first end slidably disposed within the cavity and a second end projecting from the cavity;

an electrically-conductive resilient member within the cavity bearing against the contactor and urging the contactor in the direction of the open end of the cavity, the resilient member electrically connecting the contactor and the metal body.

10. A male hydraulic coupling member as recited in claim 9 wherein the electrically-conductive resilient member is a spring.

11. A male hydraulic coupling member as recited in claim 9 wherein the electrically-conductive resilient member is a helically-wound spring.

12. A male hydraulic coupling member as recited in claim 11 wherein the spring is fabricated from a metal selected from the group consisting of: stainless steel, Inconel and brass.

13. A male hydraulic coupling member as recited in claim 9 further comprising a keeper engaged to the wall of the cavity which limits the travel of the contactor.

14. A male hydraulic coupling member as recited in claim 13 wherein the contactor comprises a circumferential projection having a first end and a second end, the first end contacting the keeper to limit the travel of the contactor and the second end bearing against the resilient member.

15. A female hydraulic coupling member comprising:
a generally cylindrical metal body having a first end and a second end;
a generally cylindrical axial bore within the body;
a retainer proximate the first end of the body and engaged to the axial bore for retaining a seal within the axial bore;
a cavity in the retainer open to the first end;
an electrically-conductive resilient member having a first end within the cavity and a second end projecting from the cavity, the resilient member being in electrical contact with the metal body.

16. A female hydraulic coupling member as recited in claim 15 wherein the electrically-conductive resilient member is a spring.

17. A female hydraulic coupling member as recited in claim 15 wherein the electrically-conductive resilient member is a helically-wound spring.

18. A female hydraulic coupling member as recited in claim 17 wherein the spring is fabricated from a metal selected from the group consisting of: stainless steel, Inconel and brass.

19. A female hydraulic coupling member as recited in claim 17 wherein the second end of the spring comprises a substantially right angle bend in the material forming the spring.

20. A female hydraulic coupling member as recited in claim 15 further comprising a keeper engaged to the wall of the cavity which limits the travel of the resilient member.

21. A female hydraulic coupling member as recited in claim 15 wherein the second end of the resilient member comprises a sharp point.

22. A female hydraulic coupling member as recited in claim 15 wherein at least a portion of the bore proximate the first end of the body has internal threads and the retainer is an externally-threaded nut.

23. A female hydraulic coupling member comprising:
a generally cylindrical metal body having a first end and a second end;
a generally cylindrical axial bore within the body;
a retainer proximate the first end of the body and engaged to the axial bore for retaining a seal within the axial bore;
a cavity in the retainer open to the first end;
an electrically-conductive contactor having a first end slidably disposed within the cavity and a second end projecting from the cavity;
an electrically-conductive resilient member within the cavity bearing against the contactor and urging the contactor in the direction of the open end of the cavity, the resilient member electrically connecting the contactor and the metal body.

24. A female hydraulic coupling member as recited in claim 23 wherein the electrically-conductive resilient member is a spring.

25. A female hydraulic coupling member as recited in claim 23 wherein the electrically-conductive resilient member is a helically-wound spring.

26. A female hydraulic coupling member as recited in claim 25 wherein the spring is fabricated from a metal selected from the group consisting of: stainless steel, Inconel and brass.

27. A female hydraulic coupling member as recited in claim 23 further comprising a keeper engaged to the wall of the cavity which limits the travel of the contactor.

28. A female hydraulic coupling member as recited in claim 27 wherein the contactor comprises a circumferential projection having a first end and a second end, the first end contacting the keeper to limit the travel of the contactor and the second end bearing against the resilient member.

29. A female hydraulic coupling member as recited in claim 23 wherein the projecting end of the contactor comprises a sharp point.

30. A female hydraulic coupling member as recited in claim 23 wherein at least a portion of the bore proximate the first end of the body has internal threads and the retainer is an externally-threaded nut.

31. A female hydraulic coupling member comprising:
a generally cylindrical metal body having a first end and a second end;
a generally cylindrical axial bore within the body;
a cavity in the body open to the first end;
an electrically-conductive resilient member comprising a helically wound spring and having a first end with in cavity and a second end projecting from the cavity, the resilient member being in electrical contact with the metal body.

32. A female hydraulic coupling member as recited in claim 31 wherein the spring is fabricated from a metal selected from the group consisting of: stainless steel, Inconel and brass.

33. A female hydraulic coupling member as recited in claim 31 further comprising a keeper engaged to the wall of the cavity which limits the travel of the resilient member.

34. A female hydraulic coupling member as recited in claim 31 wherein the second end of the resilient member comprises a sharp point.

35. A female hydraulic coupling member as recited in claim 31 wherein the second end of the spring comprises a substantially right angle bend in the material forming the spring.

36. A female hydraulic coupling member comprising:
a generally cylindrical body having a first end and a second end;
a generally cylindrical axial bore within the body;
a cavity in the cylindrical body open to the first end;
an electrically-conductive contactor having a first end slidably disposed within the cavity and a second end projecting from the cavity;
an electrically-conductive resilient member within the cavity bearing against the contactor and urging the contactor in the direction of the open end of the cavity, the resilient member electrically connecting the contactor and the metal body.

37. A female hydraulic coupling member as recited in claim 36 wherein the electrically-conductive resilient member is a spring.

38. A female hydraulic coupling member as recited in claim 36 wherein the electrically-conductive resilient member is a helically-wound spring.

39. A female hydraulic coupling member as recited in claim 38 wherein the spring is fabricated from a metal selected from the group consisting of: stainless steel, Inconel and brass.

40. A female hydraulic coupling member as recited in claim 36 further comprising a keeper engaged to the wall of the cavity which limits the travel of the contactor.

41. A female hydraulic coupling member as recited in claim 40 wherein the contactor comprises a circumferential projection having a first end and a second end, the first end contacting the keeper to limit the travel of the contactor and the second end bearing against the resilient member.

42. A female hydraulic coupling member as recited in claim 36 wherein the projecting end of the contactor comprises a sharp point.

* * * * *

UNITED STATES PATENT AND TRADEMARK OFFICE
CERTIFICATE OF CORRECTION

PATENT NO. : 7,762,824 B2
APPLICATION NO. : 11/683724
DATED : July 27, 2010
INVENTOR(S) : Robert E. Smith, III It is certified that error appears in the above-identified patent and that said Letters Patent is hereby corrected as shown below:

Column 12, line 40, in Claim 31, after "end" delete "with in" and insert --within the--

Column 12, line 59, in Claim 36, after "cylindrical" insert --metal--

Signed and Sealed this

Twenty-third Day of November, 2010

David J. Kappos
*Director of the United States Patent and Trademark Office*

UNITED STATES PATENT AND TRADEMARK OFFICE
CERTIFICATE OF CORRECTION

PATENT NO.        : 7,762,824 B2              Page 1 of 1
APPLICATION NO.   : 11/683724
DATED             : July 27, 2010
INVENTOR(S)       : Robert E. Smith, III It is certified that error appears in the above-identified patent and that said Letters Patent is hereby corrected as shown below:

On the Title Page, Item (54) and in the Specification, in column 1, lines 1-2, "HYDRAULIC COUPLING MEMBER WITH ELECTRICAL BONDING CONTRACTOR" should read --HYDRAULIC COUPLING MEMBER WITH ELECTRICAL BONDING CONTACTOR--.

Signed and Sealed this
Seventeenth Day of June, 2014

Michelle K. Lee
*Deputy Director of the United States Patent and Trademark Office*